United States Patent
Bauer et al.

(10) Patent No.: US 10,718,060 B2
(45) Date of Patent: Jul. 21, 2020

(54) ADDITIVE FOR ALKALINE ZINC PLATING

(71) Applicant: BASF SE, Ludwigshafen (DE)

(72) Inventors: Frederic Bauer, Deidesheim (DE); Tobias Urban, Bensheim (DE); Lukas Maksym, Cologne (DE)

(73) Assignee: BASF SE, Ludwigshafen (DE)

( * ) Notice: Subject to any disclaimer, the term of this patent is extended or adjusted under 35 U.S.C. 154(b) by 123 days.

(21) Appl. No.: 15/738,207

(22) PCT Filed: Jun. 22, 2016

(86) PCT No.: PCT/EP2016/064387
§ 371 (c)(1),
(2) Date: Dec. 20, 2017

(87) PCT Pub. No.: WO2016/207203
PCT Pub. Date: Dec. 29, 2016

(65) Prior Publication Data
US 2018/0179655 A1    Jun. 28, 2018

(30) Foreign Application Priority Data

Jun. 25, 2015 (EP) .................... 15173824

(51) Int. Cl.
*C25D 3/22* (2006.01)
*C25D 3/56* (2006.01)
*C25D 3/24* (2006.01)
*B32B 15/01* (2006.01)

(52) U.S. Cl.
CPC ............. *C25D 3/24* (2013.01); *B32B 15/01* (2013.01); *C25D 3/22* (2013.01); *C25D 3/565* (2013.01)

(58) Field of Classification Search
CPC .................. C25D 3/22; C25D 3/565
USPC .......................... 205/244, 309, 311
See application file for complete search history.

(56) References Cited

U.S. PATENT DOCUMENTS

| | | | |
|---|---|---|---|
| 868,729 A * | 10/1907 | Trunkhahn | C25D 3/02 205/261 |
| 3,886,054 A | 5/1975 | Duchene et al. | |
| 4,166,778 A | 9/1979 | Acimovic et al. | |
| 4,496,439 A | 1/1985 | Greif et al. | |
| 6,652,728 B1 | 11/2003 | Sonntag et al. | |
| 7,556,654 B1 | 7/2009 | Nero | |
| 7,985,722 B2 | 7/2011 | DeSanto | |
| 2005/0133376 A1 | 6/2005 | Opaskar et al. | |
| 2006/0201820 A1 | 9/2006 | Opaskar et al. | |
| 2008/0210341 A1* | 9/2008 | Yamamoto | C23C 22/17 148/267 |
| 2008/0223726 A1* | 9/2008 | Eckles | C08G 73/02 205/305 |
| 2012/0138473 A1 | 6/2012 | Ito et al. | |
| 2014/0107230 A1* | 4/2014 | Mendus | C25D 3/02 516/200 |

FOREIGN PATENT DOCUMENTS

| | | |
|---|---|---|
| CN | 1141357 A | 1/1997 |
| CN | 103687983 A | 3/2014 |
| CN | 104470995 A | 3/2015 |
| DE | 29 39 519 A1 | 4/1980 |
| DE | 196 00 743 A1 | 7/1997 |
| DE | 196 48 439 A1 | 5/1998 |
| DE | 10 2012 201 360 A1 | 8/2013 |
| EP | 0 499 434 B1 | 7/1995 |
| EP | 1 445 302 B1 | 6/2006 |
| FR | 2 740 779 B1 | 12/1997 |
| FR | 2 855 752 B1 | 8/2005 |
| GB | 190611498 * | 7/1906 |
| GB | 105255 | 4/1917 |
| JP | 60-183032 A | 9/1985 |
| JP | 1-304034 A | 12/1989 |
| JP | 2006-70231 A | 3/2006 |
| JP | 2006-83238 A | 3/2006 |
| JP | 2006-274233 A | 10/2006 |
| JP | 2007-181789 A | 7/2007 |
| JP | 2008-62179 A | 3/2008 |
| KR | 10-2004-0033376 | 4/2004 |
| WO | 03/002700 A1 | 1/2003 |
| WO | 03/006146 A1 | 1/2003 |
| WO | 03/006360 A2 | 1/2003 |
| WO | 2007/147603 A2 | 12/2007 |

OTHER PUBLICATIONS

Brakemeier et al., "Candida Bombicola: Production of Novel Alkyl Glyocsides Based on Glucose/2-Dodecanol," Appl Microbiol Biotechnol (1998), vol. 50, pp. 161-166. (Year: 1998).*

(Continued)

*Primary Examiner* — Edna Wong

(74) *Attorney, Agent, or Firm* — Oblon, McClelland, Maier & Neustadt, L.L.P.

(57) ABSTRACT

The present invention refers to a process for the electrolytic deposition of a zinc or zinc alloy coating on a metallic substrate, a zinc coated metallic substrate having a specific gloss as well as an aqueous alkaline plating bath for the electrolytic deposition of a zinc or zinc alloy coating on a metallic substrate and the use of a zinc plating bath additive in a process for the electrolytic deposition of a zinc or zinc alloy coating on a metallic substrate and for improving the optical appearance and/or the adhesion of a zinc or zinc alloy coating on a metallic substrate.

10 Claims, No Drawings

(56) References Cited

OTHER PUBLICATIONS

U.S. Pat. No. 9,738,858, Aug. 22, 2017, 2016/0312154, Bauer et al.
U.S. Appl. No. 15/521,509, filed Apr. 24, 2017, Seelmann-Eggebert et al.
U.S. Appl. No. 15/322,861, filed Dec. 29, 2016, Bauer et al.
U.S. Appl. No. 15/510,408, filed Aug. 31, 2017, 2017/0247635, Bauer et al.
Combined Chinese Office Action and Search Report dated Mar. 29, 2019 in Patent Application No. 201680036455.6 (with partial English translation and English translation of categories of cited documents), 14 pages.
International Search Report dated Jul. 26, 2016, in PCT/EP2016/064387, filed Jun. 22, 2016.
Amaral, Priscilla F.F., et al., "Biosurfactants from Yeasts: Characteristics, Production and Application", http://path.web.ua.pt/file/sen_coutinho.pdf, XP 55233762A, retrieved on Dec. 4, 2015, 14 pages.

\* cited by examiner

ADDITIVE FOR ALKALINE ZINC PLATING

FIELD OF THE INVENTION

The present invention refers to a process for the electrolytic deposition of a zinc or zinc alloy coating on a metallic substrate, a zinc or zinc alloy coated metallic substrate having a specific gloss as well as an aqueous alkaline plating bath for the electrolytic deposition of a zinc or zinc alloy coating on a metallic substrate and the use of a zinc plating bath additive in a process for the electrolytic deposition of a zinc or zinc alloy coating on a metallic substrate for improving the optical appearance and/or the adhesion of a zinc or zinc alloy coating on a metallic substrate.

BACKGROUND OF THE INVENTION

The electrolytic deposition of zinc onto metallic substrates from alkaline solution for the preparation of zinc coated metallic substrates is widely used to prevent such metallic substrates from corrosion and to impart specific optical and mechanical properties on the resulting end product. A process of such electrolytic deposition typically comprises applying a current density to a metal substrate to be zinc coated while placing said substrate in a zinc plating bath. Due to the applied current, zinc ions dissolved in the zinc plating bath deposit on the metallic substrate surface such that a zinc coating is formed thereon.

In the art, several attempts for improving the electrolytic deposition of zinc onto metallic substrates in alkaline solution have been proposed. For instance, US 2012/0138473 A1 refers to a zinc plating bath additive enabling the rapid formation of a zinc coating having small variations in the thickness depending on the position on the surface of an object to be plated. The zinc plating bath additive contains a water soluble copolymer having, as the structural units, two amine compounds. WO 03/006360 A2 refers to an alkaline zinc-nickel electroplating bath that comprises zinc ions, nickel ions, a primary brightener, which is an N-methylpyridinium compound substituted at the 3-position of the pyridine ring with a carboxylate group or a group which is hydrolyzable to a carboxylate group, and a secondary brightener, which is an aliphatic amine. U.S. Pat. No. 3,886,054 A refers to non-cyanide, alkaline electroplating baths for bright zinc plating containing quarternized polymeric condensates of alkylene polyamines and 1,3-dihalo-2-propanol as grain refiners preferably in admixture with aldehyde type brighteners and mercapto substituted heterocyclic compounds capable of producing bright, fine grained deposits over a broad current density range. US 2005/133376 A1 refers to an aqueous zinc-nickel electroplating bath, including water; nickel ion; zinc ion; at least one complexing agent; and at least one non-ionogenic, surface active polyoxyalkylene compound, wherein the bath has an alkaline pH. However, the preparation of zinc coated metallic substrates by the electrolytic deposition of zinc or zinc alloy onto the substrate is challenging. For instance, during the electrolytic deposition of zinc or a zinc alloy onto a metallic substrate, hydrogen is generated which tends to adhere on the coating surface as small gas bubbles resulting in a zinc or zinc alloy coating formed on the metallic substrate having worsened optical appearances. Such worsened optical appearances are typically visible on the surface in the form of stripes. In addition thereto, such formation of bubbles also decreases the adhesion of the zinc coating on the metallic substrate which may be detectable as small blisters on the surface and thus also decreased mechanical properties are obtained.

Thus, the addition of surfactants into the plating bath would be desirable in order to support the formation of an even coating on the metallic substrate and thus to improve the optical appearance of the zinc or zinc alloy coated metallic substrate surface. In this regard, it is to be noted that surfactants considered as being suitable in zinc plating processes should be soluble in the plating bath. However, such water-soluble surfactants also tend to stabilize foams generated during the deposition process which may then interfere with the deposition of zinc or zinc alloy on the metallic substrate such that an uneven coating is formed thereon resulting again in optically deteriorated appearances. In contrast thereto, surfactants which are known as being sufficient as regards the non-stabilization of foams are typically insoluble in the aqueous zinc plating bath and are thus considered unsuitable in such baths.

Thus, there is a need in the art for providing a process which avoids the foregoing disadvantages and especially allows for the preparation of a zinc or zinc alloy coated metallic substrate imparting very well optical characteristics to a resulting end product while its mechanical properties are kept on a high level or even improved. In particular, it is desirable to provide a process for the electrolytic deposition of a zinc or zinc alloy coating on a metallic substrate which is well balanced with regard to optical appearances resulting from the non-formation of foam and bubbles in the plating bath on the one hand and the adhesion of the zinc or zinc alloy coating on the metallic substrate on the other hand.

Accordingly, it is an object of the present invention to provide a process for the electrolytic deposition of a zinc or zinc alloy coating on a metallic substrate. Furthermore, it is an object of the present invention to provide a process in which a zinc or zinc alloy coating is formed on the metallic substrate having an even thickness. It is an even further object of the present invention to provide a process in which the optical appearance of the resulting zinc or zinc alloy coating formed on the metallic substrate is improved. Another object of the present invention is to provide a process in which the mechanical properties of the resulting zinc or zinc alloy coating formed on the metallic substrate are kept on a high level or are even improved. A still further object of the present invention is to provide a process in which a good wetting of the metallic substrate surface is obtained such that an improved release of gas bubbles is caused improving the optical appearance of the resulting zinc or zinc alloy coated metallic substrate. A further object of the present invention is to provide a process in which the obtained zinc or zinc alloy coated metallic substrate is the result of well-balanced properties with regard to the wetting behavior as well as the adhesion of the zinc or zinc alloy coating on the metallic substrate. Further objects can be gathered from the following description of the invention.

SUMMARY OF THE INVENTION

The foregoing and other objects are solved by the subject-matter of the present invention. According to a first aspect of the present invention, a process for the electrolytic deposition of a zinc or zinc alloy coating on a metallic substrate is provided. The process comprises at least the steps of:
    a) providing an aqueous alkaline plating bath comprising
        i) a source of zinc ions,
        ii) a source of hydroxide ions, and
        iii) a zinc plating bath additive being at least one biosurfactant produced by fermentation, b) placing a metallic substrate in the aqueous alkaline plating bath such that a zinc or zinc alloy coating is formed on the metallic substrate.

According to another aspect of the present invention, a zinc or zinc alloy coated metallic substrate is provided having a gloss being defined by inequation (I)

$$(GU_{with})/(GU_{without}) \geq 1.05 \qquad (I)$$

wherein $(GU_{without})$ is the gloss unit determined on a metallic substrate coated without using the at least one biosurfactant produced by fermentation defined herein and as measured with a gloss meter at a measuring angle of 85°,
$(GU_{with})$ is the gloss unit determined on a metallic substrate coated by using the at least one biosurfactant produced by fermentation defined herein and as measured with a gloss meter at a measuring angle of 85°.

According to a further aspect of the present invention, an aqueous alkaline plating bath for the electrolytic deposition of a zinc or zinc alloy coating on a metallic substrate is provided, wherein the bath comprises
  a) a source of zinc ions as defined herein,
  b) a source of hydroxide ions as defined herein, and
  c) a zinc plating bath additive as defined herein.

According to an even further aspect of the present invention, an use of a zinc plating bath additive as defined herein in a process for the electrolytic deposition of a zinc or zinc alloy coating on a metallic substrate is provided. According to a still further aspect, an use of a zinc plating bath additive as defined herein for improving the optical appearance and/or the adhesion of a zinc or zinc alloy coating on a metallic substrate is provided.

Advantageous embodiments of the inventive process for the electrolytic deposition of a zinc or zinc alloy coating on a metallic substrate are defined in the corresponding subclaims.

According to one embodiment, the source of zinc ions is zinc oxide and/or the zinc ions are present in the aqueous alkaline plating bath in an amount of from 2.0 to 30.0 g/L bath.

According to another embodiment, the source of hydroxide ions is sodium hydroxide and/or the hydroxide ions are present in the aqueous alkaline plating bath in an amount of from 50.0 to 250.0 g/L bath.

According to yet another embodiment, the at least one biosurfactant produced by fermentation is selected from the group comprising rhamnolipid, sophorolipid, glucoselipid, celluloselipid, trehaloselipid, mannosylerythritollipid, lipopeptide and mixtures thereof.

According to one embodiment, the at least one biosurfactant produced by fermentation is a rhamnolipid and/or sophorolipid.

According to another embodiment, the zinc plating bath additive is present in the aqueous alkaline plating bath in an amount of from 0.1 to 10.0 g/L bath.

According to yet another embodiment, the aqueous alkaline plating bath has a pH of from 12.0 to 14.0.

According to one embodiment, the aqueous alkaline plating bath further comprises at least one conventional additive selected from the group comprising brightener such as high-gloss brightener, basic brightener and mixtures thereof, water-soluble polymers, leveling agents, water softener, complexing agents, a source of cyanide ions and mixtures thereof.

According to another embodiment, process step b) is carried out at a temperature of from 10 to 40° C.

According to yet another embodiment, process step b) is carried out at a current density of from 0.05 to 15.0 A/dm².

According to one embodiment, the zinc or zinc alloy coating formed on the metallic substrate has a thickness of from 2.0 to 30.0 µm.

In the following, the details and preferred embodiments of the inventive process will be described in more detail. It is to be understood that these technical details and embodiments also apply to the inventive zinc or zinc alloy coated metallic substrate obtainable by the process, the inventive aqueous alkaline plating bath for the electrolytic deposition of a zinc or zinc alloy coating on a metallic substrate and its use.

DETAILED DESCRIPTION OF THE INVENTION

According to step a) of the instant process an aqueous alkaline plating bath is provided.

The term "aqueous" alkaline plating bath refers to a system in which the solvent comprises, preferably consists of, water. However, it is to be noted that said term does not exclude that the solvent comprises minor amounts of a water-miscible organic solvent selected from the group comprising methanol, ethanol, acetone, acetonitrile, tetrahydrofuran and mixtures thereof. If the solvent comprises a water-miscible organic solvent, the water-miscible organic solvent is present in an amount from 0.01 to 10.0 wt.-%, preferably from 0.01 to 7.5 wt.-%, more preferably from 0.01 to 5.0 wt.-% and most preferably from 0.01 to 2.5 wt.-%, based on the total weight of the solvent. For example, the solvent of the aqueous alkaline plating bath consists of water. If the solvent of the aqueous alkaline plating bath consists of water, the water to be used can be any water available such as tap water and/or deionised water, preferably deionised water.

The term aqueous "alkaline" plating bath refers to a system having a pH of >7. For example, the aqueous alkaline plating bath has a pH of from 12.0 to 14.0, more preferably of from 13.0 to 14.0.

It is one requirement of the instant process that the aqueous alkaline plating bath comprises a source of zinc ions.

It is appreciated that the aqueous alkaline plating bath may contain a source of zinc ions that is known to the skilled person as being suitable as source of zinc ions in an aqueous alkaline plating bath.

For example, the source of zinc ions is selected from the group comprising zinc, zinc oxide, zinc sulfate, zinc carbonate, zinc sulfamate, zinc acetate and mixtures thereof. Preferably, the source of zinc ions is zinc oxide. Zinc oxide is present as zincate in the aqueous alkaline plating bath.

The aqueous alkaline plating bath preferably contains the source of zinc ions such that the amount of zinc ions in the bath is in a range usual for such bath. Thus, the zinc ions are preferably present in the aqueous alkaline plating bath in an amount of from 2.0 to 30.0 g/L bath, preferably from 5.0 to 25.0 g/L bath and most preferably from 5.0 to 20.0 g/L bath.

The corresponding amount of the source of zinc ions to be used in the present process is determined by appropriate calculation in order to reach the given amount of zinc ions.

In one embodiment, the aqueous alkaline plating bath comprises in addition to the source of zinc ions a further source of metal ions such that a zinc alloy coating is formed on the metallic substrate by the instant process.

It is appreciated that the further source of metal ions can be any source of metal ions that is known to the skilled person as being suitable as source of metal ions in an aqueous alkaline plating bath in combination with a source of zinc ions. However, the further source of metal ions preferably comprises ions of nickel, manganese, cobalt, iron and mixtures thereof.

Preferably, the further source of metal ions may be any source of metal ions which is soluble in the aqueous alkaline plating bath. For example, the source of metal ions is selected from the group comprising nickel sulfate, manganese chloride, cobalt sulfate, iron sulfate and mixtures thereof.

If the aqueous alkaline plating bath comprises a further source of metal ions, the bath may contain the further source of metal ions in a wide range. For example, the metal ions obtained from the further source of metal ions are present in the aqueous alkaline plating bath in an amount of from 0.1 to 100.0 g/L bath, preferably from 0.2 to 75.0 g/L bath and most preferably from 0.5 to 50.0 g/L bath.

Accordingly, if the aqueous alkaline plating bath comprises a further source of metal ions, the bath preferably contains the zinc ions in an amount of from 2.0 to 30.0 g/L bath, preferably from 5.0 to 25.0 g/L bath and most preferably from 5.0 to 20.0 g/L bath and the metal ions obtained from the further source of metal ions in an amount of from 0.1 to 100.0 g/L bath, preferably from 0.2 to 75.0 g/L bath and most preferably from 0.5 to 50.0 g/L bath.

The corresponding amount of the further source of metal ions to be used in the present process in order to reach the given amount of metal ions is determined by appropriate calculation.

It is appreciated that the aqueous alkaline plating bath functions as catholyte. The anode can be any anode, such as stainless steel or platinum-coated titanium anodes or soluble zinc anodes, that is known to the skilled person as being suitable in processes for the electrolytic deposition of a zinc or zinc coating on a metallic substrate in which the zinc or zinc alloy coating is formed in an aqueous alkaline plating bath.

As already mentioned above, the plating bath has an alkaline pH. Thus, it is a further requirement of the instant process that the aqueous alkaline plating bath comprises a source of hydroxide ions.

It is appreciated that the aqueous alkaline plating bath comprises a source of hydroxide ions that is known to the skilled person as being suitable to adjust the pH of an aqueous alkaline plating bath to the desired alkaline pH.

For example, the source of hydroxide ions is selected from sodium hydroxide and/or potassium hydroxide, preferably sodium hydroxide.

The aqueous alkaline plating bath comprises the source of hydroxide ions in an amount being sufficient to provide the aqueous alkaline plating bath with the desired alkaline pH.

Preferably, the aqueous alkaline plating bath comprises the source of hydroxide ions in an amount such that the aqueous alkaline plating bath has a pH of >7, preferably from 12.0 to 14.0 and most preferably of from 13.0 to 14.0. For example, the hydroxide ions are preferably present in the aqueous alkaline plating bath in an amount of from 50.0 to 250.0 g/L bath, preferably from 50.0 to 200.0 g/L bath and most preferably from 50.0 to 150.0 g/L bath.

The corresponding amount of the source of hydroxide ions to be used in the present process in order to reach the given amount of hydroxide ions is determined by appropriate calculation.

The aqueous alkaline plating bath further comprises a zinc plating bath additive. It is one requirement of the present invention that the zinc plating bath additive is at least one biosurfactant produced by fermentation.

In the meaning of the present invention, the term "biosurfactant produced by fermentation" refers to a biosurfactant that has been produced by fermentation of bacteria or fungi. Thus, the at least one biosurfactant produced by fermentation preferably refers to the group of glycolipids comprising rhamnolipids, sophorolipids, glucoselipids, celluloselipids, trehaloselipids, mannosylerythritollipids, lipopeptides and mixtures thereof.

Said zinc plating bath additive improves the process for the electrolytic deposition of a zinc or zinc alloy coating on a metallic substrate in that only a small amount of foam or no foam is formed and, if foam is formed, in that it can be easily rinsed off from the metallic substrate. This also severely reduces the amount of foam which is attached to the zinc or zinc alloy coating on the metallic substrate when it is taken out of the aqueous alkaline plating bath such that the formation of foam marks on the coated substrate surface is clearly reduced in the present process. Thus, it was surprisingly found that the addition of the instant zinc plating bath additive in a process for the electrolytic deposition of a zinc or zinc alloy coating on a metallic substrate results in a zinc or zinc alloy coated metallic substrate having improved optical appearances. Furthermore, said zinc plating bath additive has the advantage that it shows a good wetting behavior such that the release of gas bubbles is improved from the metallic substrate resulting in a coated substrate surface showing less or no stripes resulting from such bubbles. Also, the adhesion of the zinc or zinc alloy coating on the metallic substrate is excellent by using said zinc plating bath additive. Accordingly, the optical properties are improved, i.e. less or no foam marks and stripes, and the mechanical properties of the resulting zinc or zinc alloy coating formed on the metallic substrate are kept on a high level or are even improved by using said zinc plating bath additive.

The term "at least one" biosurfactant produced by fermentation means that the biosurfactant comprises, preferably consists of, one or more biosurfactant(s) produced by fermentation.

In one embodiment, the at least one biosurfactant comprises, preferably consists of, one biosurfactant, i.e. the at least one biosurfactant comprises, preferably consists of, one biosurfactant produced by fermentation. Alternatively, the at least one biosurfactant comprises, preferably consists of, two or more biosurfactants produced by fermentation. For example, the at least one biosurfactant comprises, preferably consists of, two or three biosurfactants produced by fermentation. In other words, if the at least one zinc biosurfactant comprises, preferably consists of, two or more biosurfactants, the at least one biosurfactant comprises, preferably consists of, a mixture of different biosurfactants produced by fermentation.

If the at least one biosurfactant is a mixture of different biosurfactants produced by fermentation, the mixture comprises, preferably consists of, three to twenty biosurfactants produced by fermentation. For example, the mixture of the biosurfactants comprises, preferably consists of, five to fifteen biosurfactants produced by fermentation or the mixture of the biosurfactants comprises, preferably consists of, five to ten biosurfactants produced by fermentation.

Preferably, the at least one biosurfactant produced by fermentation comprises, more preferably consists of, one biosurfactant produced by fermentation.

Preferably, the at least one biosurfactant produced by fermentation is selected from the group comprising rhamnolipid, sophorolipid, glucoselipid, celluloselipid, trehaloselipid, mannosylerythritollipid, lipopeptide and mixtures thereof. More preferably, the at least one biosurfactant produced by fermentation is a rhamnolipid and/or a sophorolipid.

For example, the at least one biosurfactant produced by fermentation is a rhamnolipid. Alternatively, the at least one biosurfactant produced by fermentation is a sophorolipid.

The at least one biosurfactant produced by fermentation can be prepared by methods well known in the art, For example, the at least one biosurfactant can be prepared according to the methods described in EP 0 499 434, U.S. Pat. No. 7,985,722, WO 03/006146, JP 60-183032, DE 19648439, DE 19600743, JP 01-304034, CN 1337439, JP 2006-274233, KR 2004033376, JP 2006-083238, JP 2006-070231, WO 03/002700, FR 2740779, DE 2939519, U.S. Pat. No. 7,556,654, FR 2855752, EP 1445302, JP 2008-062179, JP 2007-181789, DE 102012201360A1 and the references cited therein.

In case the at least one biosurfactant produced by fermentation is a sophorolipid, the sophorolipid is preferably a sophorolipid of the general formula (Ia) and/or (Ib)

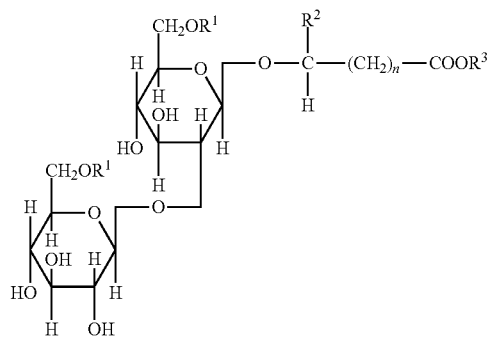
(Ia)

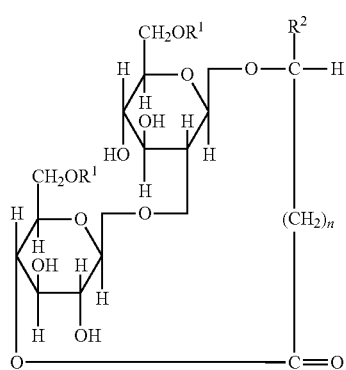
(Ib)

wherein, $R^1$ is hydrogen, acetyl or $C_1$-$C_5$-alkyl; $R^2$ is hydrogen or $C_1$-$C_{10}$-alkyl; n is an integer in the range of from 10 to 24; and, if present, $R^3$ is hydrogen or $C_1$-$C_{10}$-alkyl.

For example, the at least one biosurfactant produced by fermentation is a sophorolipid of the general formula (Ia) and (Ib)

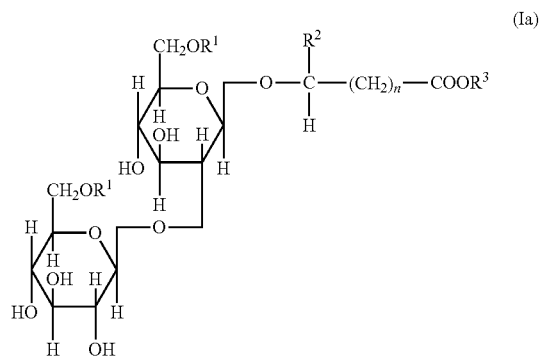
(Ia)

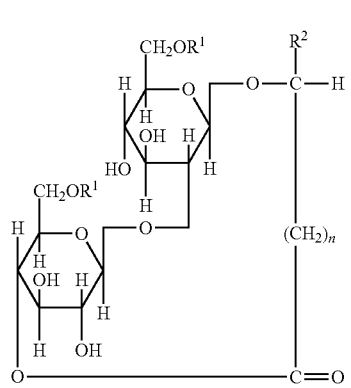
(Ib)

wherein, $R^1$ is hydrogen, acetyl or $C_1$-$C_5$-alkyl; $R^2$ is hydrogen or $C_1$-$C_{10}$-alkyl; n is an integer in the range of from 10 to 24; and, if present, $R^3$ is hydrogen or $C_1$-$C_{10}$-alkyl.

Preferably, the at least one biosurfactant produced by fermentation is a sophorolipide of the general formula (Ia) or (Ib)

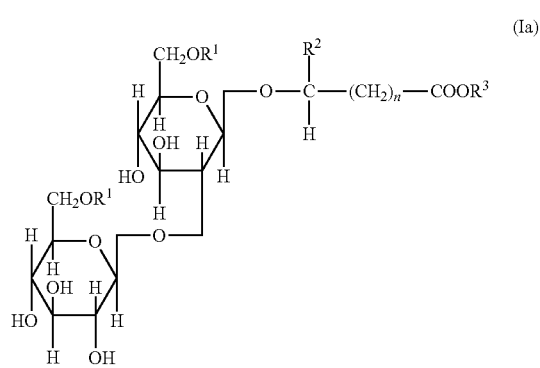
(Ia)

-continued

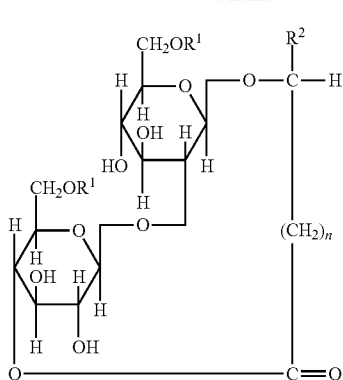
(Ib)

wherein, $R^1$ is hydrogen, acetyl or $C_1$-$C_5$-alkyl; $R^2$ is hydrogen or $C_1$-$C_{10}$-alkyl; n is an integer in the range of from 10 to 24; and, if present, $R^3$ is hydrogen or $C_1$-$C_{10}$-alkyl.

In the general formula (Ia) and/or (Ib) $R^1$ is hydrogen, acetyl or $C_1$-$C_5$-alkyl, preferably $R^1$ is acetyl or $C_1$-$C_5$-alkyl, more preferably $R^1$ is acetyl or $C_1$-$C_3$-alkyl and most preferably $R^1$ is acetyl.

As used herein, the term "alkyl" is a radical of a saturated aliphatic group, including linear chain alkyl groups and branched chain alkyl groups, wherein such linear and branched chain alkyl groups may each be optionally substituted with a hydroxyl group.

It is appreciated that $R^1$ can be $C_1$-$C_5$-alkyl such as substituted or unsubstituted, linear or branched $C_1$-$C_5$-alkyl, preferably $R^1$ is $C_1$-$C_3$-alkyl such as substituted or unsubstituted $C_1$-$C_3$-alkyl, even more preferably $R^1$ is $C_1$- or $C_2$-alkyl such as substituted or unsubstituted $C_1$- or $C_2$-alkyl and most preferably $R^1$ is $C_1$-alkyl such as substituted or unsubstituted $C_1$-alkyl.

In one embodiment, $R^1$ is unsubstituted linear $C_1$-$C_5$-alkyl, more preferably $R^1$ is unsubstituted $C_1$-$C_3$-alkyl, even more preferably $R^1$ is unsubstituted $C_1$- or $C_2$-alkyl and most preferably $R^1$ is unsubstituted $C_1$-alkyl.

Preferably, $R^1$ is acetyl.

In the general formula (Ia) and/or (Ib), $R^2$ is hydrogen or $C_1$-$C_{10}$-alkyl. Preferably, $R^2$ is hydrogen or $C_1$-$C_8$-alkyl, and most preferably $R^2$ is $C_1$-$C_8$-alkyl.

It is appreciated that $R^2$ can be $C_1$-$C_{10}$-alkyl such as substituted or unsubstituted, linear or branched $C_1$-$C_{10}$-alkyl, preferably $R^2$ is $C_1$-$C_8$-alkyl such as substituted or unsubstituted, linear or branched $C_1$-$C_8$-alkyl, even more preferably $R^2$ is $C_1$-$C_5$-alkyl such as substituted or unsubstituted, linear or branched $C_1$-$C_5$-alkyl, still more preferably $R^2$ is $C_1$-$C_3$-alkyl such as substituted or unsubstituted $C_1$-$C_3$-alkyl and most preferably $R^2$ is $C_1$- or $C_2$-alkyl such as substituted or unsubstituted $C_1$- or $C_2$-alkyl, e.g. $R^2$ is $C_1$-alkyl such as substituted or unsubstituted $C_1$-alkyl.

For example, $R^2$ is unsubstituted linear $C_1$-$C_{10}$-alkyl, preferably $R^2$ is unsubstituted linear $C_1$-$C_8$-alkyl, even more preferably $R^2$ is unsubstituted linear $C_1$-$C_5$-alkyl, still more preferably $R^2$ is unsubstituted $C_1$-$C_3$-alkyl and most preferably $R^2$ is unsubstituted $C_1$- or $C_2$-alkyl, e.g. $R^2$ is unsubstituted $C_1$-alkyl.

In the general formula (Ia) and/or (Ib), n is an integer in the range of from 10 to 24, preferably n is an integer in the range of from 12 to 24 and most preferably n is an integer in the range of from 14 to 24. For example, n is an integer in the range of from 14 to 20 such as an integer in the range of from 16 to 20. In one embodiment, n is 16, 18 or 20.

In the general formula (Ia), $R^3$ is hydrogen or $C_1$-$C_{10}$-alkyl. Preferably, $R^3$ is hydrogen or $C_1$-$C_8$-alkyl, more preferably $R^3$ is hydrogen or $C_1$-$C_5$-alkyl, even more preferably $R^3$ is hydrogen or $C_1$-$C_3$-alkyl and most preferably $R^3$ is hydrogen.

It is appreciated that $R^3$ can be $C_1$-$C_{10}$-alkyl such as substituted or unsubstituted, linear or branched $C_1$-$C_{10}$-alkyl, preferably $R^3$ is $C_1$-$C_8$-alkyl such as substituted or unsubstituted, linear or branched $C_1$-$C_8$-alkyl, even more preferably $R^3$ is $C_1$-$C_5$-alkyl such as substituted or unsubstituted, linear or branched $C_1$-$C_5$-alkyl, still more preferably $R^3$ is $C_1$-$C_3$-alkyl such as substituted or unsubstituted $C_1$-$C_3$-alkyl and most preferably $R^3$ is $C_1$- or $C_2$-alkyl such as substituted or unsubstituted $C_1$- or $C_2$-alkyl, e.g. $R^3$ is $C_1$-alkyl such as substituted or unsubstituted $C_1$-alkyl.

In one embodiment, $R^3$ is unsubstituted linear $C_1$-$C_{10}$-alkyl, preferably $R^3$ is unsubstituted linear $C_1$-$C_8$-alkyl, even more preferably $R^3$ is unsubstituted linear $C_1$-$C_5$-alkyl, still more preferably $R^3$ is unsubstituted $C_1$-$C_3$-alkyl, and most preferably $R^3$ is unsubstituted $C_1$- or $C_2$-alkyl, e.g. $R^3$ is unsubstituted $C_1$-alkyl.

Thus, it is preferred that the at least one biosurfactant produced by fermentation is a sophorolipid of the general formula (Ia),

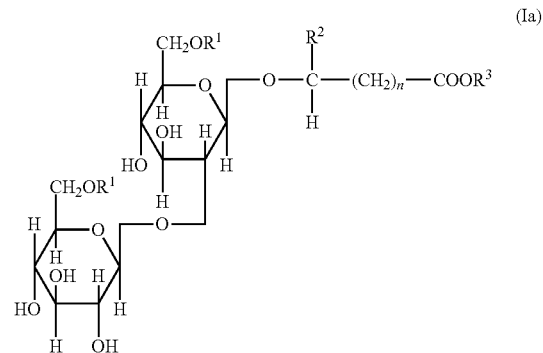
(Ia)

wherein $R^1$ is hydrogen, acetyl or $C_1$-$C_5$-alkyl; $R^2$ is hydrogen or $C_1$-$C_{10}$-alkyl; n is an integer in the range of from 10 to 24; and $R^3$ is hydrogen or $C_1$-$C_{10}$-alkyl.

More preferably, the zinc plating bath additive is at least one sophorolipid of the general formula (Ia),

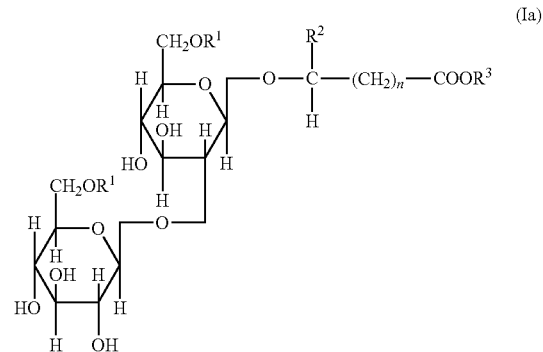
(Ia)

wherein $R^1$ is acetyl; $R^2$ is hydrogen or $C_1$-$C_8$-alkyl; n is an integer in the range of from 12 to 24, preferably from 14 to 24, and $R^3$ is hydrogen.

Most preferably, the at least one biosurfactant produced by fermentation is a sophorolipid of the general formula (Ia),

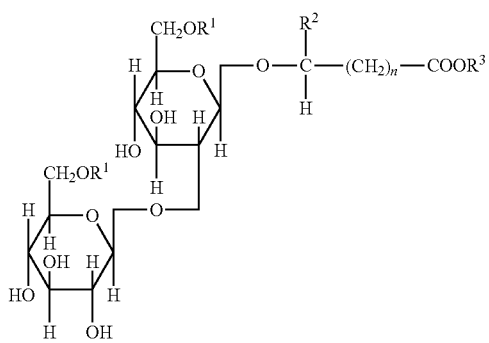

(Ia)

wherein $R^1$ is acetyl; $R^2$ is $C_1$-$C_8$-alkyl; n is an integer in the range of from 14 to 20, preferably from 16 to 20, and $R^3$ is hydrogen.

In one embodiment, the at least one biosurfactant produced by fermentation is a sophorolipid of the general formula (Ia),

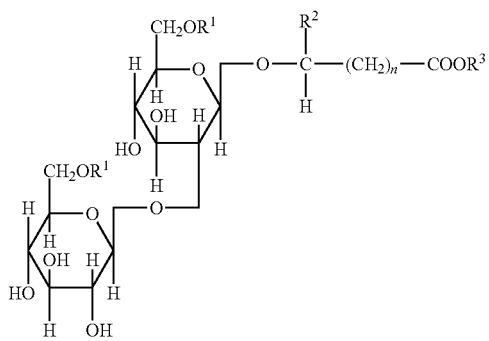

(Ia)

wherein $R^1$ is acetyl; $R^2$ is $C_1$-$C_5$-alkyl, preferably $C_1$-$C_3$-alkyl and most preferably $C_1$- or $C_2$-alkyl; n is 16, 18 or 20 and $R^3$ is hydrogen.

If $R^3$ is hydrogen, it is appreciated that the at least one biosurfactant produced by fermentation being a sophorolipid of the general formula (Ia) can be a monovalent salt, such as a sodium or potassium salt, of the sophorolipid of the general formula (Ia).

Additionally or alternatively, it is preferred that the at least one biosurfactant produced by fermentation is a sophorolipid of the general formula (Ib),

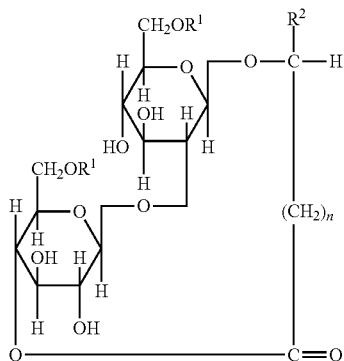

(Ib)

wherein $R^1$ is hydrogen, acetyl or $C_1$-$C_5$-alkyl; $R^2$ is hydrogen or $C_1$-$C_{10}$-alkyl, and n is an integer in the range of from 10 to 24.

More preferably, the at least one biosurfactant produced by fermentation is a sophorolipid of the general formula (Ib),

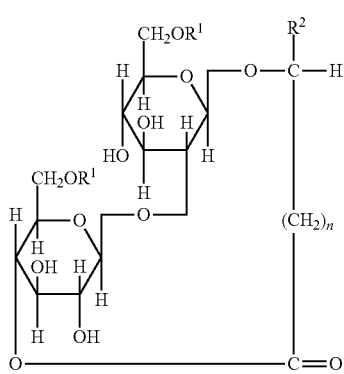

(Ib)

wherein $R^1$ is acetyl; $R^2$ is hydrogen or $C_1$-$C_8$-alkyl; and n is an integer in the range of from 12 to 24, preferably from 14 to 24.

Most preferably, the at least one biosurfactant produced by fermentation is a sophorolipid of the general formula (Ib),

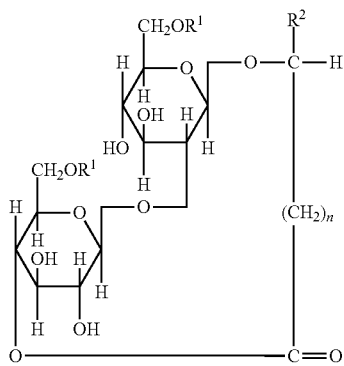

(Ib)

wherein $R^1$ is acetyl; $R^2$ is $C_1$-$C_8$-alkyl; and n is an integer in the range of from 14 to 20, preferably from 16 to 20.

In one embodiment, the at least one biosurfactant produced by fermentation is a sophorolipid of the general formula (Ib),

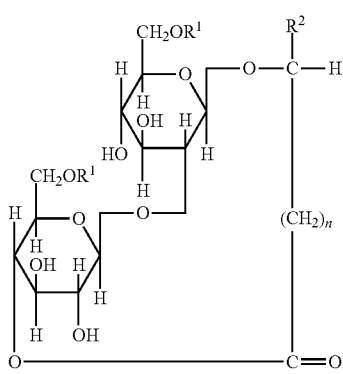
(Ib)

wherein $R^1$ is acetyl; $R^2$ is $C_1$-$C_5$-alkyl, preferably $C_1$-$C_3$-alkyl and most preferably $C_1$- or $C_2$-alkyl; and n is 16, 18 or 20.

Additionally or alternatively, the at least one biosurfactant produced by fermentation is a rhamnolipid.

In case the at least one biosurfactant produced by fermentation is a rhamnolipid, the rhamnolipid is preferably a compound of the general formula (Ic)

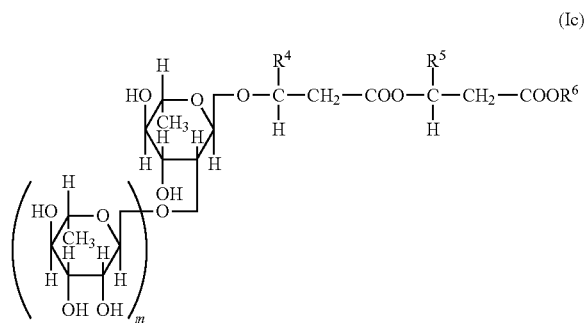
(Ic)

wherein, $R^4$ and $R^5$ are independently from each other $C_2$-$C_{24}$-alkyl; m is an integer in the range of from 0 to 2; and $R^6$ is hydrogen or $C_1$-$C_{10}$-alkyl.

It is appreciated that $R^4$ and $R^5$ can be independently from each other $C_2$-$C_{24}$-alkyl such as substituted or unsubstituted, linear or branched $C_2$-$C_{24}$-alkyl, preferably $R^4$ and $R^5$ are independently from each other $C_{10}$-$C_{24}$-alkyl such as substituted or unsubstituted $C_{10}$-$C_{24}$-alkyl, more preferably $R^4$ and $R^5$ are independently from each other $C_{12}$-$C_{24}$-alkyl such as substituted or unsubstituted $C_{12}$-$C_{24}$-alkyl, even more preferably $R^4$ and $R^5$ are independently from each other $C_{14}$-$C_{24}$-alkyl such as substituted or unsubstituted $C_{14}$-$C_{24}$-alkyl, still more preferably $R^4$ and $R^5$ are independently from each other $C_{14}$-$C_{20}$-alkyl such as substituted or unsubstituted $C_{14}$-$C_{20}$-alkyl, and most preferably $R^4$ and $R^5$ are independently from each other $C_{16}$-$C_{20}$-alkyl such as substituted or unsubstituted $C_{16}$-$C_{20}$-alkyl. For example, $R^4$ and $R^5$ are independently from each other $C_{16}$, $C_{18}$ or $C_{20}$-alkyl such as substituted or unsubstituted $C_{16}$, $C_{18}$ or $C_{20}$-alkyl.

In one embodiment, $R^4$ and $R^5$ are independently from each other unsubstituted linear $C_2$-$C_{24}$-alkyl, preferably $R^4$ and $R^5$ are independently from each other unsubstituted linear $C_{10}$-$C_{24}$-alkyl, more preferably $R^4$ and $R^5$ are independently from each other unsubstituted linear $C_{12}$-$C_{24}$-alkyl, even more preferably $R^4$ and $R^5$ are independently from each other unsubstituted linear $C_{14}$-$C_{24}$-alkyl, still more preferably $R^4$ and $R^5$ are independently from each other unsubstituted linear $C_{14}$-$C_{20}$-alkyl, and most preferably, $R^4$ and $R^5$ are independently from each other unsubstituted linear $C_{16}$-$C_{20}$-alkyl. For example, $R^4$ and $R^5$ are independently from each other unsubstituted $C_{16}$, $C_{18}$ or $C_{20}$-alkyl.

$R^4$ and $R^5$ are independently from each other $C_2$-$C_{24}$-alkyl. That is to say, $R^4$ and $R^5$ can be the same or different. Preferably, $R^4$ and $R^5$ are the same.

In the general formula (Ic), m is an integer in the range of from 0 to 2, preferably m is 0 or 1 and most preferably m is 1. Thus, if the at least one biosurfactant produced by fermentation is a rhamnolipid, the rhamnolipid is preferably a mono-, di- or polyrhamnolipid.

In the general formula (Ic), $R^6$ is hydrogen or $C_1$-$C_{10}$-alkyl. Preferably, $R^6$ is hydrogen or $C_1$-$C_8$-alkyl, more preferably $R^6$ is hydrogen or $C_1$-$C_5$-alkyl, even more preferably $R^6$ is hydrogen or $C_1$-$C_3$-alkyl and most preferably $R^6$ is hydrogen.

It is appreciated that $R^6$ can be $C_1$-$C_{10}$-alkyl such as substituted or unsubstituted, linear or branched $C_1$-$C_{10}$-alkyl, preferably $R^6$ is $C_1$-$C_8$-alkyl such as substituted or unsubstituted, linear or branched $C_1$-$C_8$-alkyl, even more preferably $R^6$ is $C_1$-$C_5$-alkyl such as substituted or unsubstituted, linear or branched $C_1$-$C_5$-alkyl, still more preferably $R^6$ is $C_1$-$C_3$-alkyl such as substituted or unsubstituted $C_1$-$C_3$-alkyl and most preferably $R^6$ is $C_1$- or $C_2$-alkyl such as substituted or unsubstituted $C_1$- or $C_2$-alkyl, e.g. $R^6$ is $C_1$-alkyl such as substituted or unsubstituted $C_1$-alkyl.

In one embodiment, $R^6$ is unsubstituted linear $C_1$-$C_{10}$-alkyl, preferably $R^6$ is unsubstituted linear $C_1$-$C_8$-alkyl, even more preferably $R^6$ is unsubstituted linear $C_1$-$C_5$-alkyl, still more preferably $R^6$ is unsubstituted $C_1$-$C_3$-alkyl, and most preferably $R^6$ is unsubstituted $C_1$- or $C_2$-alkyl, e.g. $R^6$ is unsubstituted $C_1$-alkyl.

Thus, it is preferred that the at least one biosurfactant produced by fermentation is a rhamnolipid of the general formula (Ic),

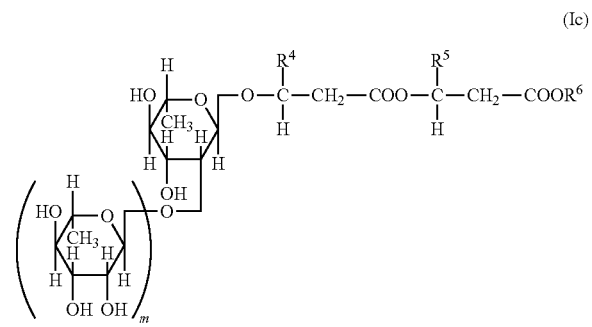
(Ic)

wherein $R^4$ and $R^5$ are independently from each other $C_{10}$-$C_{24}$-alkyl; m is 0 or 1; and $R^6$ is hydrogen or $C_1$-$C_{10}$-alkyl.

More preferably, the at least one biosurfactant produced by fermentation is a rhamnolipid of the general formula (Ic),

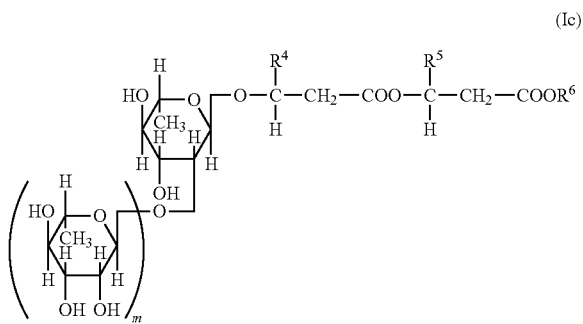

(Ic)

wherein $R^4$ and $R^5$ are independently from each other $C_{12}$-$C_{24}$-alkyl, preferably $C_{14}$-$C_{24}$-alkyl; m is 0 or 1; and $R^6$ is hydrogen.

Most preferably, the at least one biosurfactant produced by fermentation is a rhamnolipid of the general formula (Ic),

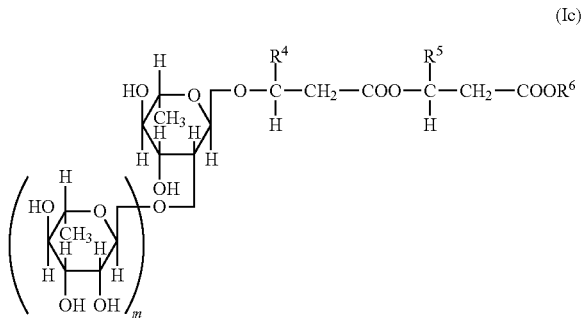

(Ic)

wherein $R^4$ and $R^5$ are independently from each other $C_{14}$-$C_{20}$-alkyl, preferably $C_{16}$-$C_{20}$-alkyl; m is 0 or 1; and $R^6$ is hydrogen.

If $R^6$ is hydrogen, it is appreciated that the at least one biosurfactant produced by fermentation being a rhamnolipid of the general formula (Ic) can be a monovalent salt, such as a sodium or potassium salt, of the rhamnolipid of the general formula (Ic).

If the at least one biosurfactant produced by fermentation comprises, preferably consists of, two or more biosurfactants produced by fermentation, the two or more biosurfactants present in the aqueous alkaline plating bath differ from each other. For example, if the at least one biosurfactant produced by fermentation comprises, preferably consists of, two or more biosurfactants produced by fermentation of general formula (Ia) and/or (Ib) and/or (Ic), the biosurfactants of general formula (Ia) and/or (Ib) and/or (Ic) preferably differ in the groups $R^2$ and $R^4$ and/or $R^5$, wherein $R^4$ and $R^5$ can be the same or different.

In an alternative embodiment, the at least one biosurfactant produced by fermentation is a lipopeptide. For example, the at least one biosurfactant produced by fermentation being a lipopeptide can be selected from the group comprising surfactin, lichenisin, nisin, iturins, fengycins, polymyxin, daptomycin, syringomycin, viscosin, amphisin, tolaasin, putisolvin, serrawettin W2, ornithin lipid and mixtures thereof.

It is appreciated that the at least one biosurfactant produced by fermentation can be present as (S)- and/or (R)-enantiomer. For example, the at least one biosurfactant produced by fermentation can be present as (S)- or (R)- enantiomer. Alternatively, the at least one biosurfactant produced by fermentation can be present as (S)- and (R)-enantiomers, i.e. the at least one biosurfactant produced by fermentation is present as a mixture of (S)- and (R)-enantiomers.

If the at least one biosurfactant produced by fermentation is present as (S)- and (R)-enantiomers, the at least one biosurfactant produced by fermentation comprises the (S)- and (R)-enantiomers preferably in a ratio ((S)/(R)) from 10:1 to 1:10, more preferably from 5:1 to 1:10, even more preferably from 4:1 to 1:10 and most preferably from 3:1 to 1:10.

It is appreciated that biosurfactants of the general formula (Ia) and/or (Ib) and/or (Ic) are well known in the art and can be prepared by methods well known to the skilled person.

The aqueous alkaline plating bath preferably contains the zinc plating bath additive being at least one biosurfactant produced by fermentation in an amount of from 0.1 to 10.0 g/L bath, preferably from 0.1 to 7.5 g/L bath and most preferably from 0.1 to 5.0 g/L bath.

The corresponding amount of the zinc plating bath additive to be used in the present process is based on the active amount of the zinc plating bath additive being at least one biosurfactant produced by fermentation.

The aqueous alkaline plating bath may further comprise at least one conventional additive selected from the group comprising brightener, water-soluble polymers, leveling agents, water softener, complexing agents, a source of cyanide ions and mixtures thereof.

For example, the aqueous alkaline plating bath may comprise known brightener, which can be classified as basic brightener and high-gloss brightener. Examples of advantageous basic brighteners are polyethyleneimines or their derivatives and/or reaction products of epichlorohydrin with heterocyclic nitrogen compounds such as imidazole, 1,2,4-triazole or their derivatives as described in, for example, U.S. Pat. No. 4,166,778. Preferably, the basic brightener is a reaction product of epichlorohydrin with heterocyclic nitrogen compounds such as imidazole, 1,2,4-triazole or their derivatives as described in, for example, U.S. Pat. No. 4,166,778, the disclosure which is herewith incorporated by reference.

The aqueous alkaline plating bath preferably comprises a basic brightener in a total amount of from 0.1 to 15.0 g/L bath, and preferably from 1.0 to 10.0 g/L bath.

In general, the high-gloss brightener includes substances from a large variety of classes such as for example brightener selected from the group comprising aldehydes, ketones, amines, polyvinyl alcohol, polyvinyl pyrrolidone, sulfur compounds, polyamines or heterocyclic nitrogen compounds and mixtures thereof as described in, for example, U.S. Pat. No. 6,652,728 B1 and U.S. Pat. No. 4,496,439 and WO 2007/147603 A2, the disclosures which are herewith incorporated by reference.

Preferably, the high-gloss brightener is n-benzylnicotinat.

The aqueous alkaline plating bath preferably comprises the high-gloss brightener in a total amount of from 0.01 to 2.0 g/L bath, preferably from 0.01 to 0.5 g/L bath.

Additionally or alternatively, the aqueous alkaline plating bath comprises known water-soluble polymers as polarization reagents such as cationic polymers, anionic polymers, amphoteric polymers and mixtures thereof, preferably cationic polymers. Examples of advantageous polarization reagents are the reaction products of N,N'-bis[3-(dialkylamino)alkyl]ureas with 1,ω-dihalogen alkanes as described in, for example, U.S. Pat. No. 6,652,728 B1, the disclosure which is herewith incorporated by reference.

The instant aqueous alkaline plating bath preferably comprises the water-soluble polymer in a total amount of from 0.1 to 15.0 g/L bath, preferably from 1.0 to 10.0 g/L bath.

Additionally or alternatively, the aqueous alkaline plating bath comprises known leveling agents such as 3-mercapto-1,2,4-triazole and/or thiourea, preferably thiourea. The instant aqueous alkaline plating bath preferably comprises the leveling agent in a total amount of from 0.1 to 2.0 g/L bath, preferably from 0.1 to 1.0 g/L bath.

Additionally or alternatively, the aqueous alkaline plating bath comprises known water softener such as EDTA, sodium silicates, tartaric acid and mixtures thereof. The instant aqueous alkaline plating bath preferably comprises the water softener in a total amount of from 0.1 to 2.0 g/L bath, preferably from 0.1 to 1.0 g/L bath.

Additionally or alternatively, the aqueous alkaline plating bath comprises known complexing agents such as sodium gluconate, diethanolamine, triethanolamine, polyethylenediamine, EDTA, aminotris(methylenephosphonic acid), sorbitol, sucrose and mixtures thereof. The instant aqueous alkaline plating bath preferably comprises the complexing agent in a total amount of from 0.1 to 100.0 g/L bath, preferably from 0.1 to 50.0 g/L bath.

Additionally or alternatively, the aqueous alkaline plating bath comprises known sources of cyanide ions such as so sodium cyanide, potassium cyanide and mixtures thereof. The instant aqueous alkaline plating bath preferably comprises the source of cyanide ions in a total amount of from 25.0 to 150.0 g/L bath, preferably from 50.0 to 100.0 g/L bath and most preferable about 75 g/L bath.

According to step b) of the instant process, a metallic substrate is placed in the aqueous alkaline plating bath such that a zinc or zinc alloy coating is formed on the metallic substrate.

It is appreciated that the aqueous alkaline plating bath of the invention can be used for all kinds of metallic substrates. Examples of useful metallic substrates include steel, stainless steel, chrome-molybdenum steel, copper, copper-zinc alloys, cast iron and the like.

In one embodiment, the metallic substrate is selected from steel, stainless steel, chrome-molybdenum steel, copper, copper-zinc alloys and the like. In an alternative embodiment, the metallic substrate is cast iron.

Preferably, the electrolytic deposition of the zinc or zinc alloy coating on the metallic substrate such that a zinc or zinc alloy coating is formed thereon in process step b) is carried out at a temperature of from 10 to 40° C., preferably from 15 to 35° C. and most preferably from 15 to 30° C. such as of about room temperature.

Additionally or alternatively, the electrolytic deposition of the zinc or zinc alloy coating on the metallic substrate such that a zinc or zinc alloy coating is formed thereon in process step b) is carried out at a current density of from 0.05 to 15.0 A/dm$^2$, preferably from 0.1 to 7.0 A/dm$^2$ and most preferably from 0.1 to 5.0 A/dm$^2$.

In one embodiment, process step b) is carried out at a temperature of from 10 to 40° C., preferably from 15 to 35° C. and most preferably from 15 to 30° C. such as of about room temperature and at a current density of from 0.05 to 15.0 A/dm$^2$, preferably from 0.1 to 7.0 A/dm$^2$ and most preferably from 0.1 to 5.0 A/dm$^2$.

The zinc or zinc alloy coating formed on the metallic substrate by the instant process preferably has a thickness of from 2.0 to 30.0 μm, more preferably from 2.0 to 25.0 μm and most preferably from 5.0 to 25.0 μm.

It is appreciated that the zinc or zinc alloy coated metallic substrate obtained by the instant process has very well optical and mechanical characteristics. For example, the zinc or zinc alloy coated metallic substrate surface has high gloss at low amount of optical deteriorations such as stripes and/or foam marks generated on the zinc or zinc alloy coated metallic substrate during the instant process. In one embodiment, the zinc or zinc alloy coated metallic substrate obtained by the instant process has high gloss and is free of optical deteriorations such as stripes and/or foam marks generated on the zinc or zinc alloy coated metallic substrate. Furthermore, the zinc or zinc alloy coated metallic substrate provides an excellent adhesion of the zinc or zinc alloy coating on the metallic substrate. Accordingly, the zinc or zinc alloy coated metallic substrate obtained by the instant process has an improved optical appearance and/or adhesion of the zinc or zinc alloy coating on the metallic substrate.

In view of the advantages obtained, the present invention is thus further directed to a zinc or zinc alloy coated metallic substrate having a gloss being defined by inequation (I)

$$(GU_{with})/(GU_{without}) \geq 1.05 \tag{I}$$

wherein $(GU_{without})$ is the gloss unit determined on a metallic substrate coated without using the at least one biosurfactant produced by fermentation defined herein and as measured with a gloss meter at a measuring angle of 85°, $(GU_{with})$ is the gloss unit determined on a metallic substrate coated by using the at least one biosurfactant produced by fermentation defined herein and as measured with a gloss meter at a measuring angle of 85°.

Preferably, the zinc or zinc alloy coated metallic substrate has a gloss being defined by inequation (Ia)

$$(GU_{with})/(GU_{without}) \geq 1.1 \tag{Ia}$$

wherein $(GU_{without})$ is the gloss unit determined on a metallic substrate coated without using the at least one biosurfactant produced by fermentation defined herein and as measured with a gloss meter at a measuring angle of 85°, $(GU_{with})$ is the gloss unit determined on a metallic substrate coated by using the at least one biosurfactant produced by fermentation defined herein and as measured with a gloss meter at a measuring angle of 85°.

More preferably, the zinc or zinc alloy coated metallic substrate has a gloss being defined by inequation (Ib)

$$(GU_{with})/(GU_{without}) \geq 1.3 \tag{Ib}$$

wherein $(GU_{without})$ is the gloss unit determined on a metallic substrate coated without using the at least one biosurfactant produced by fermentation defined herein and as measured with a gloss meter at a measuring angle of 85°, $(GU_{with})$ is the gloss unit determined on a metallic substrate coated by using the at least one biosurfactant produced by fermentation defined herein and as measured with a gloss meter at a measuring angle of 85°.

Preferably, the zinc or zinc alloy coated metallic substrate has a gloss being defined by inequation (Ic)

$$(GU_{with})/(GU_{without}) \geq 1.5 \tag{Ic}$$

wherein ($GU_{without}$) is the gloss unit determined on a metallic substrate coated without using the at least one biosurfactant produced by fermentation defined herein and as measured with a gloss meter at a measuring angle of 85°, ($GU_{with}$) is the gloss unit determined on a metallic substrate coated by using the at least one biosurfactant produced by fermentation defined herein and as measured with a gloss meter at a measuring angle of 85°.

For example, the zinc or zinc alloy coated metallic substrate has a gloss being defined by inequation (Id)

$$2.0 \leq (GU_{with})/(GU_{without}) \geq 1.5 \quad \text{(Id)}$$

wherein ($GU_{without}$) is the gloss unit determined on a metallic substrate coated without using the at least one biosurfactant produced by fermentation defined herein and as measured with a gloss meter at a measuring angle of 85°, ($GU_{with}$) is the gloss unit determined on a metallic substrate coated by using the at least one biosurfactant produced by fermentation defined herein and as measured with a gloss meter at a measuring angle of 85°.

It is appreciated that the gloss unit is measured with the gloss meter Micro-Tri-Gloss of BYK Gardner, Germany, and is the average of ten measurements.

In one embodiment, the zinc or zinc alloy coated metallic substrate is obtainable by the process for the electrolytic deposition of a zinc or zinc alloy coating on a metallic substrate as defined herein.

The instant invention is further directed to a zinc or zinc alloy coated metallic substrate obtainable by the process of the instant invention.

Furthermore, the present invention is directed to an aqueous alkaline plating bath as defined herein for the electrolytic deposition of a zinc or zinc alloy coating on a metallic substrate. In addition thereto, the present invention is directed to the use of a zinc plating bath additive as defined herein in a process for the electrolytic deposition of a zinc or zinc alloy coating on a metallic substrate. Furthermore, the present invention is directed to the use of a zinc plating bath additive as defined herein for improving the optical appearance and/or adhesion of a zinc or zinc alloy coating on a metallic substrate.

The scope and interest of the invention will be better understood based on the following examples which are intended to illustrate certain embodiments of the invention and are non-limitative.

EXAMPLES

Example 1

The properties of the present zinc plating bath additives on the gloss of a coated substrate were determined in aqueous alkaline plating baths for which an electrolyte/additive composition as outlined in the following tables was prepared.

TABLE 1

| Electrolyte composition of the aqueous alkaline plating bath | |
|---|---|
| Ingredient | Amount based on bath |
| Zinc oxide | 14.94 g/L |
| Sodium hydroxide | 130.0 g/L |
| Sodium carbonate | 40.0 g/L |

To the electrolyte composition of table 1 further additives as outlined in table 2 below were added.

TABLE 2

| Further additives of the aqueous alkaline plating bath | |
|---|---|
| Further additive[#] | Amount* based on bath |
| Polarization reagent | 3.0 g/L |
| Basic brigthener | 1.1 g/L |
| High-gloss brigthener | 50.0 mg/L |

[#]the polarization reagent is a commercially available cationic reaction product of N,N'-bis[3-(dialkylamino)alkyl]ureas with 1,ω-dihalogen alkane having an active content of ~62 wt.-%; the basic brightener is a commercially available copolymer of imidazole and epichlorohydrin having an active content of ~45 wt.-% and the high-gloss brightener is a commercially available n-benzylnicotinate having an active content of ~48 wt.-%.
*amount of ingredient is base on the amount of the active material.

To the aqueous alkaline plating bath obtained from the ingredients and the further additives described in tables 1 and 2, a zinc plating bath additive as outlined in table 3 below was added in an amount of 1.0 g/L bath, based on the active material. Examples marked with (+) serve for comparison.

The electrodeposition of the zinc coating on the substrate was carried out in a parallel cell. 0.7 L of each bath were added to different 1 L parallel cells in which steel panels were plated at 1 A for 50 min on both sides. The steel panels (steel number 1.0330 according to EN 10027-2) had the dimensions 70×100×0.3 mm. Before the steel panels were placed in the parallel cells, the panels were acid cleaned by using hydrochloric acid (15%), subjected to an electrolytic degreasing and rinsed with water. A soluble zinc anode served as anode. The baths were operated at room temperature (about 20° C.±1° C.). For each zinc plating bath additive three tests were carried out under the same conditions.

The optical appearance of the obtained zinc coated metallic substrate and of a reference sample being coated in the absence of the zinc plating bath additive are summarized in table 3 below. Furthermore, the gloss unit determined by using the gloss meter Micro-Tri-Gloss of BYK Gardner, Germany (serial number: 9 014 327) at a measuring angle of 85° for the metallic substrate coated with a zinc plating bath additive in accordance with the present invention as well as for the reference sample, i.e. the metallic substrate is coated in the absence of the zinc plating bath additive of the present application, are also outlined in table 3 below. The set-up is carried out in accordance with the operating instruction manual of the gloss meter Micro-Tri-Gloss. The gloss unit values are the average of ten measurements. The standard deviation of the gloss unit is ±2 GU (GU=gloss unit).

TABLE 3

Optical appearance

| Test | Zinc plating bath additive | Conditions | Appearance | Gloss Unit |
|---|---|---|---|---|
| 1(+) | — | 1 A for 50 min | Glossy finish with stripes | 71.4 |
| 2 | Hydrolyzed sophorolipid | 1 A for 50 min | More glossy than test 1 | 117.3 |
| 3 | Di-rhamnolipid | 1 A for 50 min | More glossy than test 1 | 108.7 |

From table 3, it can be gathered that a zinc coated metallic substrate prepared by using the zinc plating bath additive of the instant invention shows improved gloss compared to a zinc coated metallic substrate prepared without using the zinc plating bath additive of the instant invention.

Example 2

The properties of the present zinc plating bath additives on the adhesion of the coating determined by the formation of blisters were demonstrated in aqueous alkaline plating baths for which an electrolyte composition as outlined in table 4 below was prepared.

TABLE 4

Electrolyte composition of the aqueous alkaline plating bath

| Ingredient | Amount based on bath |
|---|---|
| Zinc oxide | 14.94 g/L |
| Sodium hydroxide | 130.0 g/L |
| Sodium carbonate | 40.0 g/L |

To the electrolyte composition of table 4 further additives as outlined in table 5 below were added.

TABLE 5

Further additives of the aqueous alkaline plating bath

| Further additive# | Amount* based on bath |
|---|---|
| Polarization reagent | 3.0 g/L |
| Basic brigthener | 1.1 g/L |
| High-gloss brigthener | 50.0 mg/L | the polarization reagent is a commercially available cationic reaction product of N,N'-bis[3-(dialkylamino)alkyl]ureas with 1,ω-dihalogen alkane having an active content of ~62 wt.-%; the basic brightener is a commercially available copolymer of imidazole and epichlorohydrin having an active content of ~45 wt.-% and the high-gloss brightener is a commercially available n-benzylnicotinate having an active content of ~48 wt.-%.
*amount of ingredient is base on the amount of the active material.

To the aqueous alkaline plating bath obtained from the ingredients and the further additives described in tables 4 and 5, a zinc plating bath additive being a biosurfactant as outlined in table 6 below was added in an amount of 1.0 g/L bath, based on the active material. Examples marked with (+) serve for comparison.

Each bath was added to a parallel cell in which punched steel panels were plated at a current of 1 A/dm² for 50 min, 0.5 A/dm² for 75 min or 3 A/dm² for 25 min on both sides. A soluble zinc anode served as anode. The bath was operated at room temperature (about 20° C.±1° C.). The steel panels (steel number 1.0330 according to EN 10027-2) had the dimensions 70×100×0.3 mm. For each zinc plating bath additive three tests were carried out under the same conditions. Before the steel panels were placed in the parallel cell, each steel panel was acid cleaned by using hydrochloric acid (15%), and rinsed with water. Then, each steel panel was subjected to an alkaline degreasing by using an aqueous degreasing solution as outlined in table 6. After the alkaline degreasing, each steel panel was rinsed with water, dried until moisture is no longer visible and weighed.

TABLE 6

Composition of the aqueous degreasing solution

| Ingredient | Amount |
|---|---|
| NaOH (pA) | 20 g/L |
| Na$_2$CO$_3$ (LPW quality) | 22 g/L |
| Na$_3$PO$_4$ × 12 H$_2$O (pure) | 16 g/L |
| Trilon ® powder #1 | 1 g/L |
| Lutensol ® AP 10 #2 | 0.5 g/L |

1 is the chelating agent tetrasodium salt of ethylenediaminetetraacetic acid and is commercially available from BASF, Germany.
2 is a non-ionic surfactant and is commercially available from BASF, Germany.

The aqueous degreasing solution was prepared by dissolving and mixing the single ingredients in distilled water such that a clear solution is obtained.

After the coating, the steel panels were rinsed with water, dried until moisture is no longer visible and weighed. Then, the steel panels were wrapped in a foil and stored 3 months at room temperature (about 20° C.±1° C.). Subsequently, the steel panel surfaces were evaluated with regard to the formation of pits and blisters. For this, a pressure-sensitive adhesive tape having a width of at least 50 mm and a bonding strength of 6-10 N/25 mm width was attached on the surface of each coated steel panel. The adhesive tapes were evenly pressed on the steel panel surfaces by hand (the even adhesion can be controlled by the color of the steel panel surfaces through the tape) and then quickly removed from the surfaces. The tape removal was carried out by removing the tapes from the steel panel surfaces within 0.5-1 s in an angle of about 60°. The removal of the tapes was carried out within 5 min after their application on the steel panel surfaces. The tests were carried out at a temperature of about 23° C.±2° C. and a humidity of about 50%±5%. The evaluation of the steel panel surfaces was carried under good illumination from all sides with the naked eye.

The adhesion of the coating determined by the formation of pits and blisters observed on the obtained zinc coated substrates are summarized in table 7 below.

TABLE 7

The zinc plating bath additive and the coating adhesion of the obtained zinc coated substrate

| Test | Zinc plating bath additive | Coating adhesion after 3 months |
|---|---|---|
| 1(+) | — | formation of pits |
| 2 | Hydrolyzed sophorolipid | no blisters, good adhesion |
| 3 | Sophorolipid | no blisters, good adhesion |
| 4 | Di-rhamnolipid | no blisters, good adhesion |

From table 7, it can be gathered that a zinc coated metallic substrate prepared by using the zinc plating bath additive of the instant invention, namely a biosurfactant produced by fermentation, shows improved behavior as regards the formation of pits and blisters compared to a zinc coated metallic substrate prepared without using the zinc plating bath additive of the instant invention. Thus, it can be concluded that a zinc coated metallic substrate prepared by using the zinc plating bath additive of the instant invention has improved coating adhesion compared to a zinc coated metallic substrate prepared without using the zinc plating bath additive of the instant invention.

The invention claimed is:

1. A process, comprising:
placing a metallic substrate in an aqueous alkaline plating bath comprising:
   i) a source of zinc ions,
   ii) a source of hydroxide ions, and
   iii) a zinc plating bath additive that is a biosurfactant produced by fermentation; and
electrolytically depositing a zinc or zinc alloy coating on the metallic substrate, to obtain a zinc or zinc alloy coated metallic substrate,
wherein the biosurfactant produced by fermentation is at least one selected from the group consisting of a rhamnolipid, a sophorolipid, a celluloselipid, a trehaloselipid, a mannosylerythritollipid, and a lipopeptide.

2. The process according to claim 1, wherein at least one of the following conditions is satisfied:
the source of zinc ions is zinc oxide; and
the zinc ions are present in the aqueous alkaline plating bath in an amount of from 2.0 to 30.0 g/L bath.

3. The process according to claim 1, wherein at least one of the following conditions is satisfied:
the source of hydroxide ions is sodium hydroxide; and
the hydroxide ions are present in the aqueous alkaline plating bath in an amount of from 50.0 to 250.0 g/L bath.

4. The process according to claim 1, wherein the biosurfactant produced by fermentation is a rhamnolipid, a sophorolipid, or both.

5. The process according to claim 1, wherein the zinc plating bath additive is present in the aqueous alkaline plating bath in an amount of from 0.1 to 10.0 g/L bath.

6. The process according to claim 1, wherein the aqueous alkaline plating bath has a pH of from 12.0 to 14.0.

7. The process according to claim 1, wherein the aqueous alkaline plating bath further comprises at least one additive selected from the group consisting of a brightener, a water-soluble polymer, a leveling agent, a water softener, a complexing agent, and a source of cyanide ions.

8. The process according to claim 1, wherein the depositing occurs at a temperature of from 10 to 40° C.

9. The process according to claim 1, wherein the depositing occurs at a current density of from 0.05 to 15.0 A/dm$^2$.

10. The process according to claim 1, wherein the zinc or zinc alloy coating formed on the metallic substrate has a thickness of from 2.0 to 30.0 μm.

* * * * *

UNITED STATES PATENT AND TRADEMARK OFFICE
CERTIFICATE OF CORRECTION

Page 1 of 1

PATENT NO. : 10,718,060 B2
APPLICATION NO. : 15/738207
DATED : July 21, 2020
INVENTOR(S) : Frederic Bauer et al.

It is certified that error appears in the above-identified patent and that said Letters Patent is hereby corrected as shown below:

On the Title Page

Column 1, Item (51), under "Int. Cl." Lines 2-4, "B32B 15/01 (2006.01)" should read
-- C25D 3/56 (2006.01) --.

Column 2, Item (56) under "OTHER PUBLICATIONS", Line 2, "Glyocsides" should read
-- Glycosides -- and "Appl Microbiol Biotechnol" should read -- Appl. Microbiol. Biotechnol. --.

In the Specification

Column 3, Line 22, "comprises" should read -- comprises: --.

Column 6, Line 33, "i.e." should read -- i.e., --.

Column 7, Line 11, "For" should read -- for --.

Column 10, Line 15, "e.g." should read -- e.g., --.

Column 15, Line 62, "ornithin" should read -- ornithine --.

Column 16, Line 47, "example" should read -- example, --.

Column 20, under TABLE 2, Line 24, "brigthener" should read -- brightener --;
    Line 25, "brigthener" should read -- brightener --;
    Line 31, "base" should read -- based --.

Column 21, under TABLE 5, Line 43, "brigthener" should read -- brightener --;
    Line 44, "brigthener" should read -- brightener --;
    Line 49, "base" should read -- based --.

Signed and Sealed this
Fifth Day of January, 2021

Andrei Iancu
*Director of the United States Patent and Trademark Office*